Figure 1:
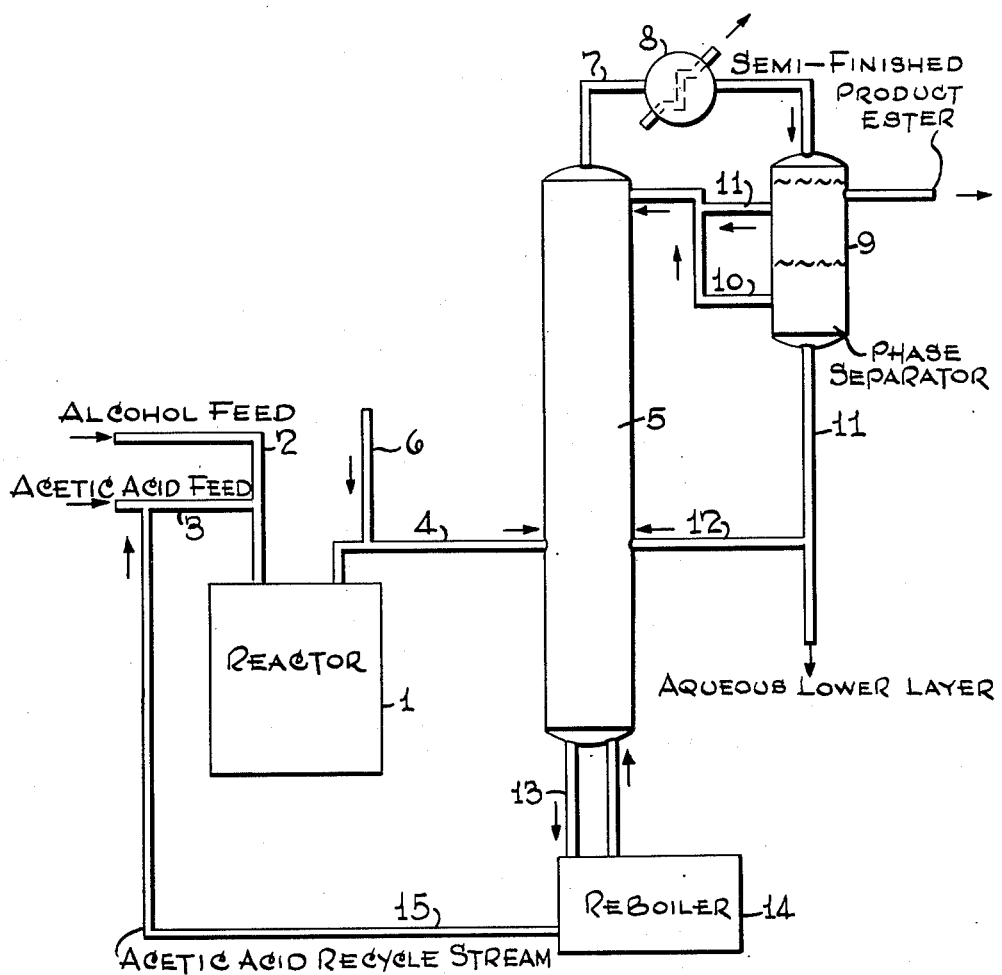

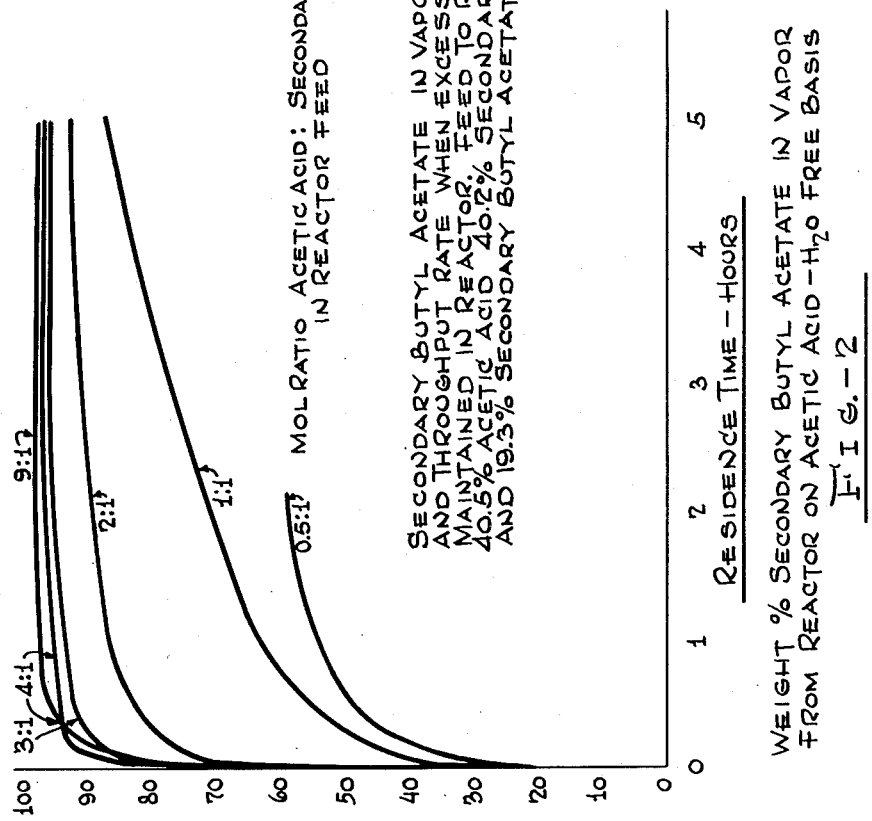

UNITED STATES PATENT OFFICE 2,645,660

EXCESS ACID PROCESS FOR THE MANUFACTURE OF ESTERS

William M. Drout, Jr., Clark Township, Union County, and William G. Emerson, Jr., Elizabeth, N. J., assignors to Standard Oil Development Company, a corporation of Delaware Application May 16, 1951, Serial No. 226,596

9 Claims. (Cl. 260—488)

This invention relates to improved continuous methods of esterifying aliphatic monocarboxylic acids and aliphatic monohydric alcohols. More particularly, it relates to an improved method of making esters boiling below the boiling point of the acid utilized, especially the acetic acid esters of secondary butyl alcohol and isopropyl alcohol.

In the production of high purity esters by the liquid-phase, acid-catalyzed reaction, e. g., between secondary butyl alcohol and glacial acetic acid, the relative concentration of reactants is critical in the economy of manufacture. With high mol ratios of alcohol to acid or with an equimolar mixture of alcohol to acid in the feed to the acetate reactor, manufacture of pure acetate is difficult because of the formation of interfering azeotropes, i. e., alcohol-$H_2O$, ester-$H_2O$, ester-alcohol azeotropes of nearly identical vapor pressures and therefore nearly identical atmospheric boiling points. Separation of alcohol from acetate by water extraction requires a costly recovery process, and separation by fractional distillation results in low yields of product and relatively large amounts of alcohol-acetate and/or alcohol-acetate-water azeotropes. These azeotropes must be reprocessed (several methods are used) or a substantial monetary loss is incurred. In the most economical process, the reaction is carried out with a large excess of acetic acid in order that nearly all of the alcohol entering the reactor can be converted to acetate. Thus the difficult alcohol-acetate separation is avoided.

One of the better known methods of conducting the esterification is disclosed in Harrington, U. S. Patent No. 2,147,341. The latter process proposes starting the esterification in a reaction still with an excess of aliphatic acid in proportion to the alcohol, and feeding continuously to the still aliphatic acid and alcohol in approximately stoichiometrical proportions.

This latter process as disclosed suffers from certain disadvantages. The esterification reactor is also the reboiler of a distillation column. Product vapor from the reactor is fed to the bottom plate of the column and thus the reflux from this plate contains some condensed vapors from the reactor. This reflux from the bottom of the column to the reactor therefore contains appreciable amounts of ester which forces the equilibrium esterification reaction in the wrong direction. Thus, high conversion of alcohol to ester cannot be obtained.

This first disadvantage leads to a second disadvantage. The resultant rather long contact time necessarily results in the system being exposed for an excessive period to the sulfuric acid catalyst employed, which leads to formation of undesirable side products, such as tars, polymers, olefins, etc. To prevent this it is necessary to add large quantities of water, e. g., 10 to 40%, to the system in order to prevent this undesirable decomposition. This large amount of water increases process and equipment costs, and, in addition, further drives the reaction to the left, i. e., in the undesirable direction as regards ester conversion.

This invention provides a method of overcoming the beforementioned difficulties. The method comprises, among other things, feeding the esterification reaction mixture from the reaction zone into an intermediate portion of a distillation zone wherein the ester is separated, withdrawing a bottoms from the distillation column which consists predominantly only of the aliphatic acid, i. e., contains preferably at least 97 wt. % aliphatic acid, and recycling this predominantly only acid bottoms to the reaction zone.

Water is added to the distillation column feed only in sufficient quantities to make up the ester and unreacted alcohol azeotrope compositions, thus facilitating the ester separation from the aliphatic carboxylic acid, but without returning water to the reactor with the aliphatic carboxylic acid.

The process of this invention thus results in an effective carboxylic acid: alcohol ratio as much as 15 times greater in the reaction zone than is obtained by the processes of the prior art. This in turn results in much larger ester conversion figures in much shorter time intervals as explained in detail below.

The aliphatic carboxylic acids that may be employed comprise in general any acid which boils above the corresponding ester or ester-water azeotrope, e. g., formic, acetic, propionic, butyric and valeric acids. The preferred acid for use in this process is acetic acid.

It is also preferred to utilize the acids in as dry form as is economically obtainable. In starting the reaction approximately 3 to 1 volumes of acid to alcohol are used.

The aliphatic alcohols employed may comprise, depending on the boiling point of the ester and the acid, alcohols such as methyl, ethyl, isopropyl, n-propyl, sec. butyl, iso butyl, and iso amyl. Methyl, ethyl, isopropyl, n-propyl, and sec. butyl alcohols are especially useful in this process. It is also preferred that the alcohols be in as dry a form as is economically obtainable.

The acid catalysts that may be employed are sulfuric, hydrochloric, benzene sulfonic and sulfonic acids in general.

Sulfuric acid in an amount of from 1.0 to 1.5 wt. % based on the total reaction system is preferred.

This invention will be better understood by reference to the flow diagram shown in the drawing Figure I. The description utilizes secondary butyl alcohol, acetic acid and sulfuric acid as the system.

In the system shown the process is initiated in a reaction zone 1 containing an excess of aliphatic acid, e. g., 3 to 1 volumes of acid in proportion to the alcohol. The subsequent feed to the reaction zone contains the acid and alcohol in approximately theoretical proportions. The alcohol feed enters the reaction zone through line 2 and the acetic acid feed through line 3. Sulfuric acid is present in the reaction zone in an amount of about 1.0 wt. %. The reaction is carried out at a temperature in the range of about 109° to 113° C., which results in the vaporization of the ester, water, unreacted alcohol, and some acetic acid. This vaporous mixture at a temperature of about 109° C. is fed by line 4 into an intermediate portion of distillation column 5. The concentration of components, particularly ester and acid concentrations in this reaction mixture determines the exact point of entry of the mixture, e. g., the more ester in the mixture, the higher the point of entry into the distillation column. Water in this particular case is introduced through line 6 into line 4, in sufficient quantities to make the aqueous azeotrope compositions with the acetate and unreacted alcohol, and is preferably fed as liquid at or about its boiling point. The azeotropes boil lower than the pure alcohol or ester and therefore are more readily removed from the unreacted acid. By locating the feed point in the mid section of the distillation zone, it is possible to obtain nearly complete separation of the various acetate, alcohol, water azeotropes and pure components from the unreacted acid. The acetic acid with some of the alcohol tends to flow downwardly in the column and becomes stripped of the alcohol so that at the bottom of the column the acetic acid is practically anhydrous and free of the alcohol. The vaporous azeotropes are removed through line 7 at a temperature of about 87° C. and the mixture is cooled and condensed in condenser 8, whence it flows into water separator 9. A two phase separation is obtained in separator 9, an upper ester layer and a bottom aqueous alcohol layer. The semi-finished ester product withdrawn from separator 9 is purified elsewhere by conventional means. Both water and ester layers also are sent as reflux through lines 10 and 11 to the distillation column 5. Water can also be returned through lines 11 and 12 in place of or supplementing fresh water entering through line 6 to the same plate as the feed in the distillation column to drive the acetic acid down as bottoms and drive ester up the column. This depends upon the particular reaction system employed. Predominantly only acetic acid is withdrawn from the bottom of distillation column 5 through line 13 to reboiler 14 which is maintained at about 115°–120° C. The acetic acid is present there in an amount corresponding to at least 97% by weight. The acetic acid is withdrawn from reboiler 14 through line 15 and recycled back to the reactor through the same line as the feed or through a different line. This acid recycle increases the effective acid concentration in the reaction zone by an extremely large extent, as is detailed further in the examples.

As stated above, the reaction mixture is fed into an intermediate position of the distillation column, the exact position depending on the composition of the mixture and its physical state. Conditions can be regulated such that a vaporous mixture of only ester, water and alcohol enters the distillation column, or hot liquid directly from the reaction system can be fed into the distillation column. Economies of operation and available equipment determine this variable. In any case the bottoms from the distillation column contains predominantly only aliphatic carboxylic acid and sulfuric acid too, if the latter is sent over from the reaction mixture. This latter type of operation is less costly from an operating standpoint, but is more costly as regards equipment, because a special corrosion-resistant column is required.

As stated also above, the reflux should be the same composition as the overhead vapors from the distillation column. Under certain conditions, i. e., when there is not sufficient water produced in the esterification reaction to satisfy the water-ester azeotrope such as in the production of sec. butyl acetate, it is desirable to recycle the aqueous phase to the same plate (the same portion of the distillation column) as the feed.

The following examples provide additional details of the process and highlight its advantages.

EXAMPLE I

Table I below gives the particular data on a secondary butyl acetate prepared according to this invention:

*Table I*

SECONDARY BUTYL ACETATE REACTOR OPERATION

| Component | Analyses (Wgt. Percent) | | | | Recovery of Component (Percent) | Temperature of Reaction Mixture (° C.) | Residence Time in Reactor (Hours) | Alcohol Conversion (Percent) |
|---|---|---|---|---|---|---|---|---|
| | Feed | Reaction Mixture | Vapor Product From Reactor | | | | | |
| $H_2SO_4$ | | 1.4 | | | | 110.2 | 2.0 | 93.8 |
| Acetic acid | 70.8 | 59.4 | 46.9 | | 97.5 | | | |
| Secondary butyl alcohol | 29.2 | 0.5 | 1.1 | | 97.6 | | | |
| $H_2O$ | | 3.1 | 9.1 | | 136.0 | | | |
| Secondary butyl acetate | | 35.6 | 42.9 | | | | | |
| Total | | 100.0 | 100.0 | | | | | |
| $H_2SO_4$ | | 1.0 | | | | 109.3 | 5.0 | 95.0 |
| Acetic Acid | 76.4 | 70.2 | 55.6 | | 96.5 | | | |
| Secondary butyl alcohol | 23.6 | 0.2 | 1.1 | | 99.5 | | | |
| $H_2O$ | | 4.1 | 8.1 | | 147.0 | | | |
| Secondary butyl acetate | | 24.5 | 35.2 | | | | | |
| Total | | 100.0 | | | | | | |

The data of Table I and additional data obtained are summarized in Figure II. Figure II summarizes particularly the weight per cent of secondary butyl acetate in crude acetate vapor from the reaction zone as a function of the higher ratio of acetic acid to secondary butyl alcohol in reactor feed and residence time.

The figure shows the importance of the increase of effective concentration of acid in the reaction zone. It shows that with a mol ratio of acetic acid to secondary butyl alcohol in the reactor feed of 3:1 or greater, 95–99% acetate may be produced with the same residence time of 1.5 hours which is used in the conventional excess acetate process to make only 85–88% secondary butyl acetate. The reactor throughput rate can be increased to more than twice the conventional throughput rate (0.5 hr. residence time) and 90–96% acetate may be produced with a 3:1 or greater mol ratio of acid to alcohol in the reactor feed. In general, it can be seen that secondary butyl acetate of higher purity can be manufactured over a larger range of reactor throughput rates, when the ratio of acetic acid to secondary butyl alcohol in the reactor feed, and therefore in the reaction mixture, is increased.

EXAMPLE II

In this example the process of this invention was compared with a process as contemplated in the prior art wherein the reactor and reboiler constituted a single zone and consequently made no provisions for increasing the effective acid concentration as taught herein. The results are listed below in Table II, wherein Runs A and B represent results obtained by conducting the process as taught in U. S. P. 2,147,341, and Runs C and D represent the results obtained utilizing the features of this invention:

*Table II*

| Runs | Reactor Feed Mol Ratio. HAc:SBOH | Initial Charge or Total Reactor Feed Mol Ratio, HAc:SBOH | Reaction Mixture Mol Ratio HAc:SBOH | Sulfuric Acid Concentration (Wt. Percent) | Residence Time in Reaction Mixture (Hours) | Alcohol Conversion (Percent) |
|---|---|---|---|---|---|---|
| A | 1:1 | 11.9:1 | 10.5:1 | 1.9 | 8.9 | 83.1 |
| B | 1:1 | 16.0:1 | 22.4:1 | 2.4 | 19.9 | 88.2 |
| C | 1:1 | 3:1 | 147:1 | 1.4 | 2.0 | 98.8 |
| D | 1:1 | 4:1 | 172:1 | 1.0 | 5.0 | 95.0 |

These results show quite clearly that conversion increases of 7 to 15% were obtained with residence times only approximately ¼ that utilized in the prior art processes. The economic significance is apparent.

It will be understood further that the foregoing examples and apparatus have been given merely for purposes of illustration, but that other modifications of the present invention are possible without departing from the scope of the appended claims.

What is claimed is:

1. A continuous process for producing esters boiling below the boiling point of the acid utilized, which comprises the steps of reacting an excess of a monocarboxylic $C_1$–$C_5$ aliphatic acid with a monohydric $C_1$–$C_5$ alcohol in the presence of an acid catalyst in a reaction zone in the absence of extraneous water; feeding the reaction mixture into an intermediate portion of a distillation zone; withdrawing a bottoms liquid fraction from the distillation zone, said bottoms consisting of predominantly the aliphatic monocarboxylic acid substantially free of the alcohol; recycling this bottoms fraction to the reaction zone; and taking overhead from the distillation zone a product containing ester, alcohol, and water substantially free of aliphatic monocarboxylic acid.

2. A process as in claim 1 wherein the water evolved during the esterification is insufficient to satisfy the azeotropic requirements which comprises the additional step of adding sufficient water to the distillation zone to make up the ester, alcohol, water azeotrope composition.

3. A continuous process for producing esters lower boiling than the acid being utilized, which comprises the steps of reacting an excess of an aliphatic $C_1$–$C_5$ monocarboxylic acid with a secondary aliphatic $C_1$–$C_5$ monohydric alcohol in a reaction zone in the absence of extraneous water; feeding the reaction mixture into an intermediate portion of a distillation zone; withdrawing a bottoms fraction containing at least 97 wt. % aliphatic monocarboxylic acid substantially free of the alcohol; recycling this bottoms fraction to the reaction zone; and taking overhead from the distillation zone a product containing ester, alcohol, and water substantially free of aliphatic monocarboxylic acid.

4. A process as in claim 3 wherein the water evolved during the esterification is insufficient to satisfy the azeotropic requirements which comprises the additional step of adding sufficient water to the distillation zone to make up the ester, alcohol, water azeotrope composition.

5. A continuous process for producing esters lower boiling than the acid being utilized, which comprises the steps of reacting an aliphatic $C_1$–$C_5$ monocarboxylic acid with an aliphatic $C_1$–$C_5$ monohydric alcohol in the proportion of about 3:1 volumes of acid to alcohol in the presence of an acid catalyst in a reaction zone in the absence of extraneous water; feeding the liquid reaction mixture into an intermediate portion of a distillation zone; withdrawing a bottoms fraction containing at least 97 wt. % aliphatic monocarboxylic acid together with the acid catalyst from the distillation zone; recycling this bottoms fraction to the reaction zone; and taking overhead from the distillation zone a product containing ester, alcohol and water substantially free of aliphatic monocarboxylic acid.

6. A continuous process for preparing secondary butyl acetate, which comprises the steps of reacting initially in a reaction zone an excess of acetic acid with secondary butyl alcohol, the initial volume ratio of acetic acid to secondary butyl alcohol being not over about 3 to 1, in the presence of a sulfuric acid catalyst present in an amount of from 1.0 to 1.5 wt. % but in the absence of extraneous water; taking off a vaporous reaction mixture comprising secondary butyl acetate, alcohol, acetic acid, and water from the reaction zone; adding additional water to the vaporous mixture to make up the secondary butyl acetate, secondary butyl alcohol, water azeotrope; feeding the vaporous reaction mixture with added water to an intermediate portion of a distillation zone; withdrawing as bottoms from the distillation zone a liquid fraction consisting of at least 97 wt. % acetic acid; recycling this withdrawn liquid acetic acid to the reaction zone; taking overhead from the distillation zone an azeotrope of secondary butyl alcohol, water, and secondary butyl acetate; condensing this overhead product and separating the condensate into an ester phase and an aqueous phase containing the alcohol.

7. A process as in claim 6, including the additional step of returning the aqueous phase from the separation step to the distillation zone at a point of entry about the same as the vaporous reaction mixture.

8. A process as in claim 3 in which the ester being produced is isopropyl acetate, the alcohol is isopropyl alcohol and the acid is acetic acid.

9. In a continuous process for preparing secondary butyl acetate wherein an excess of acetic acid is reacted with secondary butyl alcohol in a reaction zone in the presence of a sulfuric acid catalyst but in the absence of extraneous water, the improvement which comprises the steps of taking off a vaporous reaction mixture comprising secondary butyl acetate, alcohol, acetic acid, and water from the reaction zone; adding additional water to the vaporous mixture to make up the desired water azeotropes; feeding the vaporous reaction mixture with added water to an intermediate portion of a distillation zone; withdrawing as bottoms from the distillation zone a liquid fraction consisting of at least 97 wt. % acetic acid; recycling this withdrawn liquid acetic acid to the reaction zone; taking overhead from the distillation zone an azeotrope of secondary butyl alcohol, water, and secondary butyl acetate; condensing this overhead product and separating the condensate into an ester phase and an aqueous phase containing alcohol.

WILLIAM M. DROUT, JR.
WILLIAM G. EMERSON, JR.

References Cited in the file of this patent

UNITED STATES PATENTS

| Number | Name | Date |
|---|---|---|
| 1,400,849 | Backhaus | Dec. 20, 1921 |
| 2,575,722 | Maincon | Nov. 20, 1951 |

FOREIGN PATENTS

| Number | Country | Date |
|---|---|---|
| 15,337/28 | Australia | May 14, 1929 |